(12) United States Patent
Norris et al.

(10) Patent No.: US 7,088,830 B2
(45) Date of Patent: *Aug. 8, 2006

(54) PARAMETRIC RING EMITTER

(75) Inventors: Elwood G. Norris, Poway, CA (US); James J. Croft, III, Poway, CA (US); Vaughn W. North, Sandy, UT (US)

(73) Assignee: American Technology Corporation, San Diego, CA (US)

( * ) Notice: Subject to any disclaimer, the term of this patent is extended or adjusted under 35 U.S.C. 154(b) by 940 days.

This patent is subject to a terminal disclaimer.

(21) Appl. No.: 10/101,426

(22) Filed: Mar. 18, 2002

(65) Prior Publication Data

US 2002/0126854 A1    Sep. 12, 2002

Related U.S. Application Data

(63) Continuation-in-part of application No. 09/135,732, filed on Aug. 18, 1998, now Pat. No. 6,359,990, and a continuation-in-part of application No. 08/846,637, filed on Apr. 30, 1997, now Pat. No. 5,859,915.

(51) Int. Cl.
*H04B 3/00* (2006.01)

(52) U.S. Cl. .............................. 381/77; 381/75; 381/82; 367/155

(58) Field of Classification Search ................ 367/153, 367/155, 138; 381/77, 79, 75, 82

See application file for complete search history.

(56) References Cited

U.S. PATENT DOCUMENTS

| | | | |
|---|---|---|---|
| 1,616,639 | A | 2/1927 | Sprague |
| 1,951,669 | A | 3/1934 | Ramsey |
| 2,461,344 | A | 2/1949 | Olson |

(Continued)

FOREIGN PATENT DOCUMENTS

JP          60150399 A        8/1985

(Continued)

OTHER PUBLICATIONS

The Audio Spotlight: An Application of Nonlinear Interaction of Sound Waves to a New Type of Loudspeaker Design, Yoneyama, et al. J. Acoustical Society of America 73(5), May 1983, pp. 1532-1536.

(Continued)

*Primary Examiner*—Xu Mei
*Assistant Examiner*—Jason Kurr
(74) *Attorney, Agent, or Firm*—Thorpe North & Western LLP

(57) ABSTRACT

A sound emitting device for providing at least one new sonic or subsonic frequency as a by-product of emitting a waveform of at least two ultrasonic frequencies whose difference in value corresponds to the desired new sonic or subsonic frequency. The device includes a parametric emitting perimeter or plurality of emitter segments positioned around a central open section. This open section is structured with a diagonal width greater than a cross-sectional diagonal of the parametric emitting perimeter. An ultrasonic frequency signal source and sonic/subsonic frequency generator are coupled together to a modulating circuit for mixing an ultrasonic frequency signal with an electrical signal corresponding to the at least one new sonic or subsonic frequency. The modulator output is coupled to the emitting perimeter which comprises ultrasonic frequency emitting material for propagating the mixed waveform into air for demodulating the waveform to generate the at least one new sonic or subsonic frequency.

16 Claims, 3 Drawing Sheets

U.S. PATENT DOCUMENTS

| | | | |
|---|---|---|---|
| 3,012,222 A | 12/1961 | Hagemann | |
| 3,398,810 A | 8/1968 | Clark, III | |
| 3,461,421 A | 8/1969 | Stover | |
| 3,513,439 A * | 5/1970 | Egli | 367/155 |
| 3,612,211 A | 10/1971 | Clark, III | |
| 3,613,069 A | 10/1971 | Cary, Jr. et al. | |
| 3,710,332 A | 1/1973 | Tischner et al. | |
| 3,723,957 A | 3/1973 | Damon | |
| 3,742,433 A | 6/1973 | Kay et al. | |
| 3,836,951 A | 9/1974 | Geren et al. | |
| 4,005,278 A | 1/1977 | Gorike | |
| 4,207,571 A | 6/1980 | Passey | |
| 4,245,136 A | 1/1981 | Krauel, Jr. | |
| 4,378,596 A | 3/1983 | Clark | |
| 4,418,248 A * | 11/1983 | Mathis | 381/373 |
| 4,429,194 A | 1/1984 | Kamon et al. | |
| 4,433,750 A * | 2/1984 | Neese | 181/179 |
| 4,593,160 A | 6/1986 | Nakamura | |
| 4,823,908 A | 4/1989 | Tanaka et al. | |
| 4,908,805 A * | 3/1990 | Sprenkels et al. | 367/181 |
| 4,991,148 A | 2/1991 | Gilchrist | |
| 5,181,301 A | 1/1993 | Wheeler | |
| 5,317,543 A | 5/1994 | Grosch | |
| 5,357,578 A * | 10/1994 | Taniishi | 381/354 |
| 5,844,998 A * | 12/1998 | Nageno | 381/371 |
| 6,606,389 B1 * | 8/2003 | Selfridge et al. | 381/111 |

FOREIGN PATENT DOCUMENTS

JP    H2-265400    10/1990

OTHER PUBLICATIONS

Parametric Loudspeaker—Characteristics of Acoustic Field and Suitable Modulation of Carrier Ultrasound, Kenichi Aoki, Tomoo Kamakura, Yoshiro Kumamoto, Electronics and Communications in Japan, Part 3, vol. 74, No. 9, 1991, pp. 76-82.

Ultrasonic Ranging System by Polaroid.

Excerpts From on Combination Tones, Helmholtz, Editor's Comments on Paper 16, pp. 228-238.

Parametric Acoustic Nondirectional Radiator, Makarov, et al., Acustica, vol. 77 (1992), pp. 240-242.

Parametric Acoustic Array, Westervelt, P.J., The Journal of the Acoustical Society of America, vol. 35, No. 4, pp. 535-537.

* cited by examiner

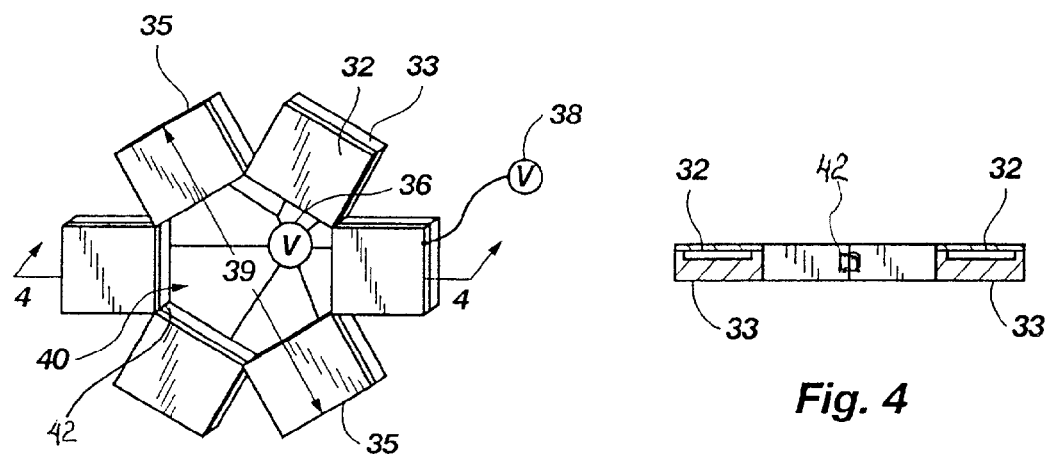
Fig. 3
Fig. 4
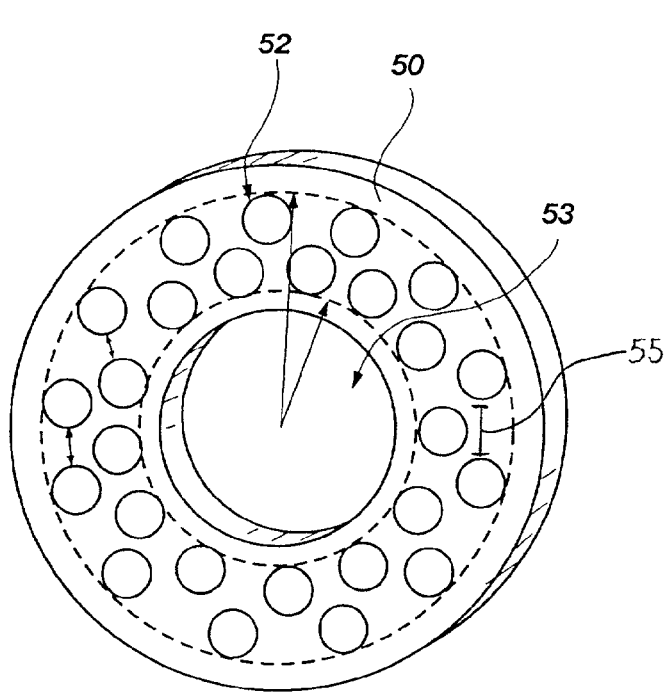
Fig. 5
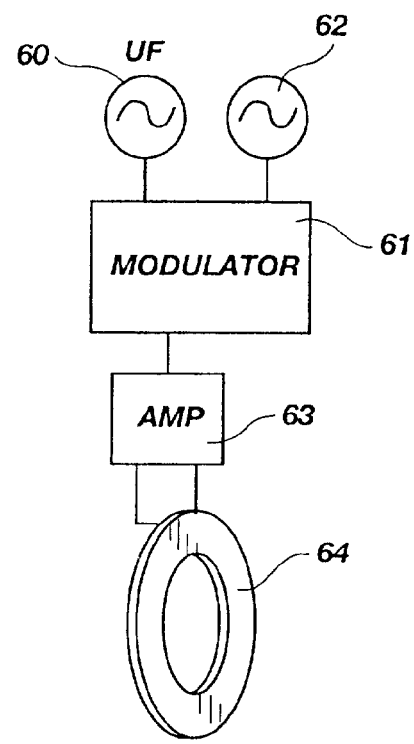
Fig. 6

PARAMETRIC RING EMITTER

This is a continuation-in-part application of copending application Ser. No. 09/135,732 filed Aug. 18, 1998, entitled Parametric Ring Emitter (U.S. Pat. No. 6,359,990) and Ser. No. 08/846,637, entitled "Light Enhanced Bullhorn", filed Apr. 30, 1997 (U.S. Pat. No. 5,859,915).

BACKGROUND OF THE INVENTION

1. Field of the Invention

This invention pertains to parametric sound projection devices which incorporate acoustic heterodyning as basis for generating audio output. More particularly, the present invention relates to a device and method for enhancing a directional parametric speaker power output.

2. State of the Art

Recent developments have been made involving sound propagation from parametric speakers, acoustic heterodyning, and other forms of modulation of multiple ultrasonic frequencies to generate a new frequency. In theory, sound is developed by the interaction in air (as a nonlinear medium) of two ultrasonic frequencies whose difference in value falls within the audio range or subsonic range. The resulting compression waves are projected within the air as a nonlinear medium. The present inventor has succeeded in advancing parametric audio devices from a state of curious research to commercially acceptable speaker systems which offer unique advantages over all other forms of audio devices. Applications are now expanding to general audio systems for home, office and automobile, military communications systems, weapons devices, point of purchase advertising sources and numerous other specialty devices.

A brief explanation of the theoretical parametric speaker array is provided in "Audio spotlight: An application of nonlinear interaction of sound waves to a new type of loudspeaker design" by Yoneyama et al as published in the *Journal of Acoustic Society of America*, 73(5), May 1983. Although technical components and the theory of sound generation from a difference signal between two interfering ultrasonic frequencies is described, the practical realization of a commercial sound system was apparently unsuccessful. This weakness in the prior art remained despite the assembly of a parametric speaker array consisting of as many as 547 piezoelectric transducers yielding a speaker diameter of 40–50 cm. Virtually all prior research in the field of parametric sound has been based on the use of tightly clustered conventional ultrasonic transducers, typically of bimorph character.

A common structural feature of prior art attempts to develop an effective parametric speaker is to form a substantially continuous array of transducers across the surface of a support plate. The natural assumption appears to be that filling in the interior area of the support plate with the maximum number of transducers is appropriate to maximize sound pressure level (SPL). Conventional speaker theory would suggest that increasing the number of transducers would indeed contribute to increased SPL. Accordingly, prior art parametric speakers are typically illustrated with bimorf transducers compactly positioned in honeycomb array. Until demonstration of the parametric ring concept as set forth in the parent patent applications, a general perception has existed that an increase in emitter surface was a primary factor for increasing SPL of a parametric emitter device.

Although not related to parametric audio production as presented in this application, a prior examination in the US Patent and Trademark Office of a parent application of the present invention discussed U.S. Pat. No. 4,418,248 by Mathis. The Mathis patent illustrates (patent FIGS. 1, 2 and 3) stereophones which are designed for operation in the audio spectrum. The inner radius 13 comprises a diaphragm which is designed to operate at audio frequencies greater than 1000 Hz. This frequency range corresponds to the upper audio frequency band. A second transducer comprising diaphragm 25 covers the lower frequency range of the audio spectrum. See column 3, lines 13 through 17. The outer radius 33 simply comprises ports which pass the lower frequency range audio vibrations within the stereo headphone. Accordingly, both the inner and outer radii are merely transmitting audio sounds in a conventional manner to enhance both upper and lower audio bandwidth.

In contrast, a parametric speaker projects ultrasonic emissions which are decoupled within the air for audio output. The principles of operation between conventional audio speakers as represented by Mathis and the present invention which involves a parametric speaker are very unrelated. It is important to distinguish between (i) conventional audio speakers that directly propagate audio sound by vibration of a diaphragm at a corresponding audio frequency range and (ii) parametric speakers which vibrate a diaphragm at ultrasonic frequencies of 25 Khz or greater and demodulate the ultrasonic output in air to indirectly produce audio output. It will be apparent to those skilled in the art that a ring of emitters producing audio output directly into the air such as Mathis will not correspond to a ring of ultrasonic emitters whose output is pumped into the air, which then operates to decouple an audio sideband frequency as audio output. In the former case, the audio speaker operates as a two-dimensional or point source of origination of the sound. In the later parametric embodiment, the audio sound source is similar to a three-dimensional column of air molecules which project out like a beam of light from the ultrasonic emitter. In essence, this column of air becomes the vibrating speaker element. Accordingly, prior art versions of audio speaker rings would not be relevant to the dynamics involved in a parametric ring emitter.

SUMMARY OF THE INVENTION

These and other objects are realized in a parametric speaker device for providing at least one new sonic frequency as a by-product of emitting at least two ultrasonic frequencies from an ultrasonic frequency emitter. The device includes an emitting perimeter of ultrasonic emitting material having an outer radius and an inner radius respectively surrounding an interior open space. The ratio of (i) the difference between the inner radius and the outer radius of the emitting perimeter to (ii) the outer radius of the emitting perimeter is approximately within a numerical range of 0.1 to 1.0.

The invention is also represented by a method for enhancing efficiency of a parametric speaker system with respect to energy output based upon emitter surface area, comprising the steps of a) forming an ultrasonic frequency emitting perimeter on a support base around an open region which is substantially void of ultrasonic emitting material; and b) emitting ultrasonic frequency from the emitting perimeter to generate sonic or subsonic sound within surrounding air as part of a parametric speaker system.

Other objects, features and benefits will be apparent to those skilled in the art, based on the following detailed description, in combination with the accompanying drawings.

DESCRIPTION OF THE DRAWINGS

FIG. 3 graphically illustrates an additional embodiment of the present invention incorporating an array of emitter strips to form a polygon configuration.

FIG. 4 shows a cross section of the array of FIG. 3, taken along the lines 4—4.

FIG. 5 shows a annular disk with a spaced array of emitter elements in two rings.

FIG. 6 illustrates a block diagram of typical circuitry associated with a parametric speaker.

DETAILED DESCRIPTION OF THE PREFERRED EMBODIMENT

Figure 1:
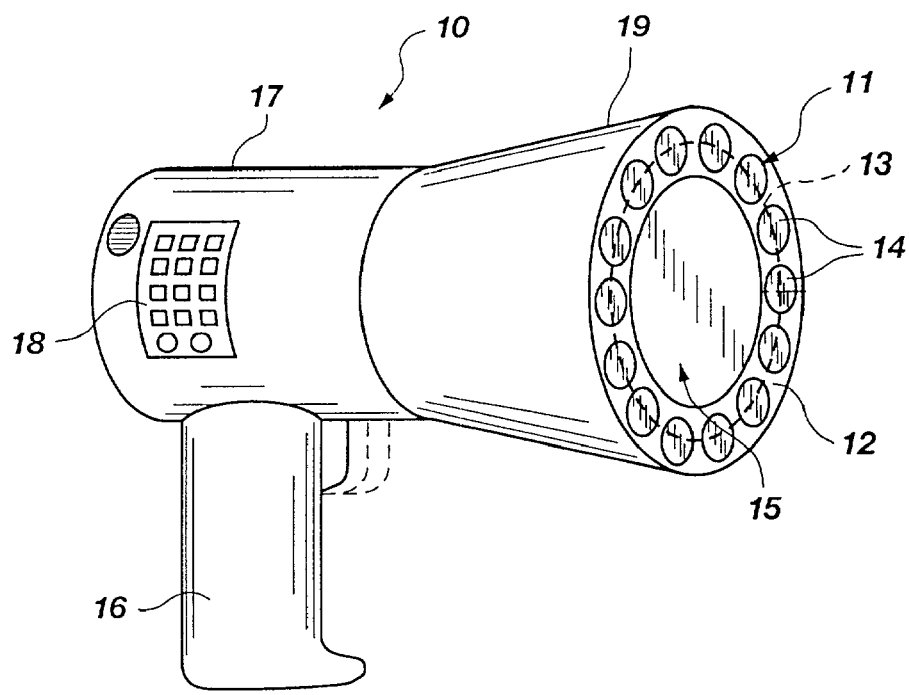
FIG. 1 illustrates a perspective view of a bullhorn device incorporating a circular parametric emitting perimeter.

FIG. 1 illustrates one embodiment of a parametric speaker system useful for sound propagation. It will be apparent that this specific structure is intended to represent many different types of projection devices such as general speakers, stereo systems, PA systems, megaphones, etc., particularly where a direction orientation in a narrow beam is desired.

This basic system comprises a sound emitting device 10 for providing at least one new sonic or subsonic frequency as a by-product of emitting at least two ultrasonic frequencies from an ultrasonic frequency emitter 11. This is in accordance with the general principles of acoustic heterodyning as referenced above. A support plate 12 forms a base or housing for supporting an audio emitting perimeter 13 of ultrasonic frequency emitting material 14. The support plate may be comprised of virtually any material which operates to stabilize the emitter 11 in its desired perimeter configuration. Plastics, metals, dielectrics, ceramics and woods are illustrative of this broad choice of compositions. FIG. 1 shows a bullhorn application with a handle 16, circuitry housing 17 with control pad 18, and a support housing 19 for supporting the support plate with emitting perimeter.

The emitter material 14 comprises bimorf transducers of conventional design and is configured for attachment to the support plate around a central open section 15 which is at least partially bounded by the emitter material. The significance of developing a parametric speaker having the emitting perimeter format arises from the ability of the parametric speaker to supply unusually efficient sound output, despite the use of emitter material only at the perimeter. This unique feature of parametric speakers enables a perimeter emitter to provide comparable audio output to a fully embodied emitter array with emitter material extending across the full area of the support plate. Because the perimeter configuration has a substantially reduced number of ultrasonic transducers or emitter surface area, less drive voltage is required and enhanced efficiency results.

Figure 2:
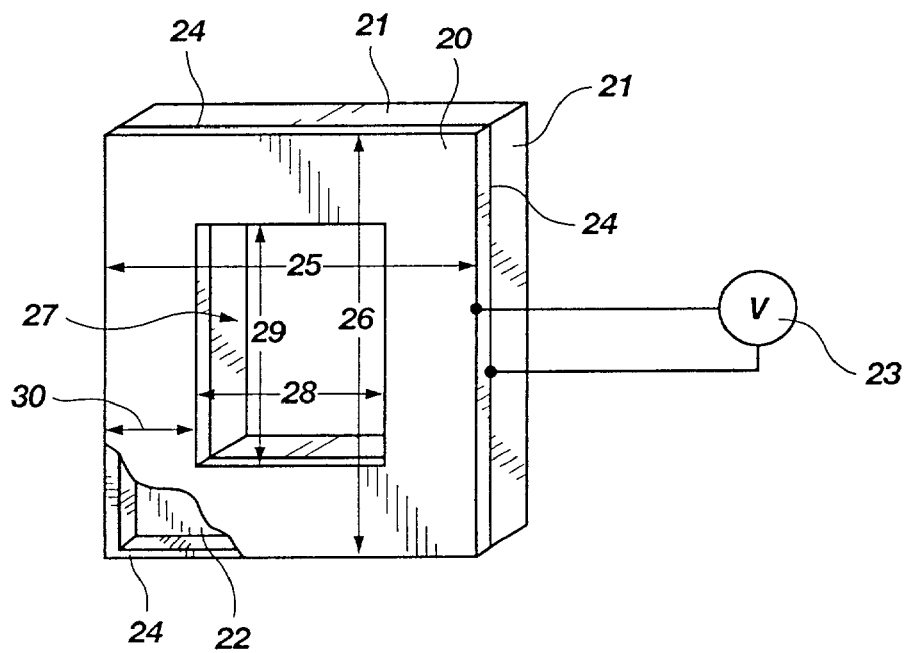
FIG. 2 depicts perspective view of a rectangular emitting perimeter utilizing PVDF emitting film.

Various forms of emitter devices may be used in this perimeter configuration. Traditionally, parametric speakers have utilized bimorf transducers. The present inventor has developed effective parametric output with polyvinyl? PVDF film, as well as electrostatic emitter structures. The selection of material will be a function of desired shape of the support plate, as well as the type of audio range desired. For example, FIG. 2 illustrates a midrange speaker using piezoelectric or PVDF film 20, a substrate 21 for supporting the film in suspended state above a cavity 22, and a voltage source with attendant audio signal 23. The rectangular configuration is suitable for a film-type emitter because the film can be placed in tension across the opposing sides or diametric edges 24 to provide proper tension in the film. For determining roll off parameters for low range frequencies, the diameter of the speaker is measured along the horizontal axis 25 or vertical axis 26. Normally, the longer diameter (in this example, 25) will control.

The central section 27 is an open portion in the substrate 21 and emitter 20. The horizontal diameter 28 of the opening is approximately twice the distance 30 across a cross-section of the emitting perimeter. This forms a ratio of 0.5 for this orientation. The vertical opening spans a distance 29 which is ⅝ths the distance 30, equivalent to a ratio of approximately 0.4, a more preferred ratio based on empirical results.

FIGS. 3 and 4 illustrate a hexagon shape, representative of a general polygon configuration. In this example, electrostatic emitters 32 are supported on a stator substrate 33 over a cavity 34, and are arranged along the respective straight diametric edges 35 of the polygon. Each stator 33 is powered in parallel from a driver 36 which is coupled to an audio signal source (not shown). This embodiment is representative of electrostatic speakers generally, and may include a separate biasing circuit 38, as well as electret materials which can be pre-charged to a desired condition. It will be apparent that virtually any speaker shape can be implemented by segmenting the emitter perimeter into a combination of straight segments and/or curves, and by positioning these in end-to-end orientation to circumscribe an open, central region 40. Such shapes need not be symmetrical, but may be of virtually any shape. This flexibility enables the present invention to conform to unusual room shapes and positioning requirements for speaker use. An advantage of the FIG. 3 embodiment is that this configuration can be folded for compact storage by providing hinge connections 42 between the respective segments (represented by 33 and 35). By releasing one or more of the hinged connections, the remaining segments can be folded upon each other.

Figure 7:
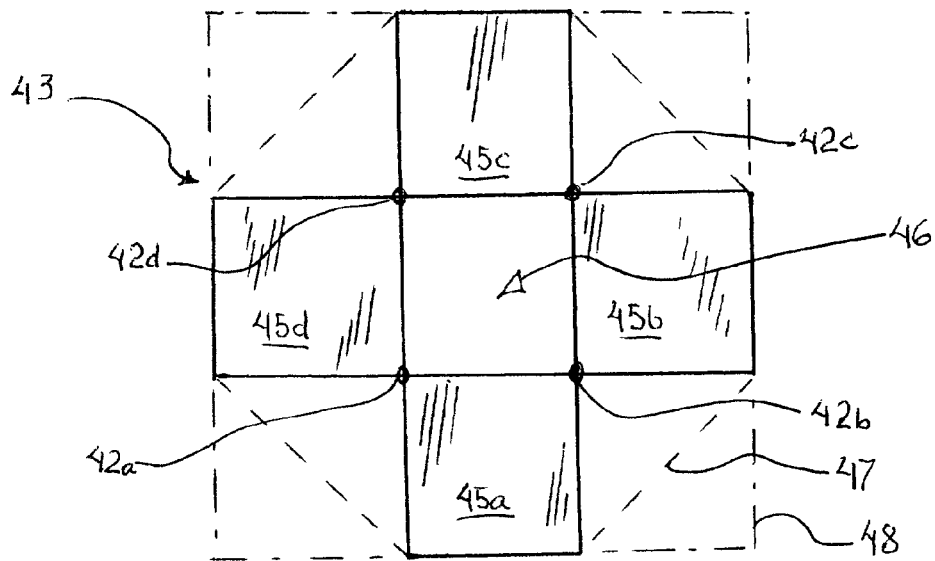
FIG. 7 graphically depicts an array of four speaker segments joined to enclose a square opening in accordance with the present invention.
Figure 8:
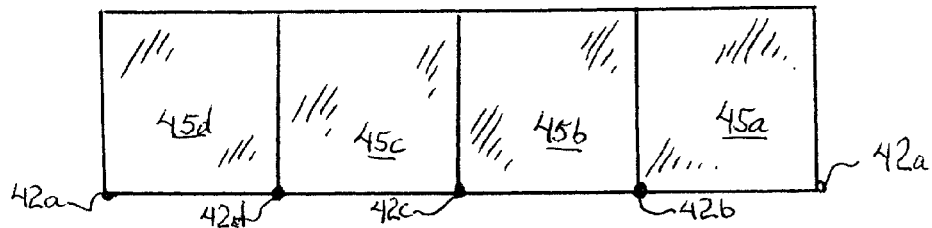
FIG. 8 illustrates the array of segments of FIG. 7 uncoupled at one junction to form a linear array.
Figure 9:
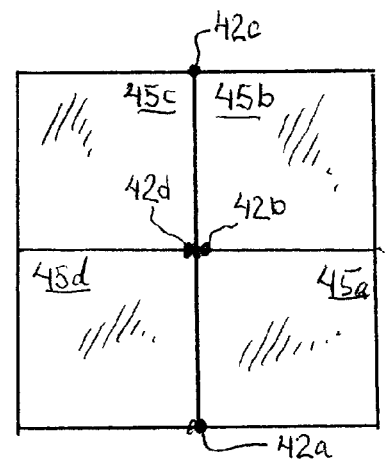
FIG. 9 shows the linear array of FIG. 8 folded or collapsed to a storage configuration.

FIGS. 7, 8 and 9, for example, demonstrates that a four-square speaker array 43 can be folded to a collapsed volume of 4/7ths of the total volume of the ring configuration of FIG. 7. Hinge members 42 $a, b, c,$ and $d$ provide attachment of the four emitter segments 45 $a, b, c,$ and $d$ to form a rectangular configuration of the speaker system, surrounding an open section 46. By detaching segment 45a from segment 45d, the segments can be configured in a linear array for storage on a low-height shelf. FIG. 9 suggests that the linear array can be reconfigured to a square shape by collapsing the base portions of 45a and 45b against the base portions of 45c and d respectively. Dashed line 47 of FIG. 7 represents the spacial volume of the array based on diagonal edges extending from corner to corner of the circumscribing speaker segments. Based on this volume, the volumes of FIGS. 8 and 9 are 4/7ths that of FIG. 7. If the rectangular volume represented by dashed line 48 is used as a reference, the volumes of FIG. 8 and 9 are only half that of FIG. 7. Such flexibility is particularly useful for minimizing the volume of these speaker elements during shipping and storage. Other prior art speaker systems generally remain constant in the volume requirements for use and storage.

FIG. 5 shows a circular ring 50 with an array of bimorf transducers 52 disposed in a double ring format. This is in direct contrast to conventional practice which would dictate that the internal region 53 be filled with transducers to maximize the audio output. The amount of open space in this embodiment has been configured with a ratio of 0.3, based on the relationship of the difference between the outer radius $r_o$, and the inner radius $r_i$. This is represented by the expression $(r_o-r_i)/r_o$. Hereagain, it will be apparent that various numbers of rings could be selected, as well as differing ratios as desired.

The open sections 27, 40, and 53 have primary significance in the present invention with respect to parametric speaker systems. As mentioned above, prior art attempts to develop a commercial parametric speaker have been frustrated by low SPL and nominal performance, particularly at low frequencies. Prior art solutions to these deficiencies have involved maximizing the amount of emitter surface area by packing transducers into a tight cluster or honeycomb configuration. It was believed that by increasing the surface area of radiating speakers, increased air movement would supply a corresponding increase in SPL output. This is consistent with conventional speaker design characteristics for both dynamic and electrostatic speaker systems.

The unexpected phenomenon of the present invention as represented recognizes that ultrasonic emitting elements within a perimeter of the parametric speaker can be removed without seriously affecting the SPL and operation of the speaker device. Indeed, some fringe distortion around the primary frequency and transmission axis appears to be reduced with the elimination of internal emitter devices. Air molecules contained within the beam or column of air appear to be energized, even though the only source of ultrasonic radiation is a virtual circumscribing tubular perimeter of energy. The process of filling the integral region on the support plate with additional ultrasonic emitter material does not appear to offer a proportional increase in SPL. Therefore, the efficiency of the parametric speaker is enhanced by use of a perimeter emitter configuration, as opposed to a continuous emitting surface.

Another possible explanation for the surprising efficiency of the parametric ring configuration of the present invention relates to the shock limit of air with respect to acoustic loading. When intense energy levels are localized at the interface of air with the transducer, air may be driven to its limit of response. When this limit is reached, a shock effect occurs, leading to distortion of the acoustic output, as well as energy losses. With prior art use of bimorf transducers in parametric speakers, the practice was to concentrate the transducers in tight clusters in hopes of reaching acceptable commercial levels of sound reproduction. It is possible that such strategies were counter productive because the intense localized energy near the transducers exceeded the shock limit of the air, thereby wasting acoustic energy. The use of the parametric ring configuration avoids such intense loading of the air by opening the center of the speaker array. As a consequence, the open ring system generates SPL which approaches that of a fully driven plate of transducers typified by the prior art, yet with fewer transducers and less required power input.

Based on empirical studies, maximum efficiency is realized with a bimorf array as shown in FIG. 5, wherein the emitting perimeter has an outer radius $r_o$ and an inner radius $r_i$, which falls within the ratio of $(r_o-r_i)/r_o$ having a value within the numerical range of 0.1 to less than 1.0. The preferred efficiency of 0.3 is produced with a preferred range of 0.2 to 0.4. Other emitter configurations and materials will likely vary from these exemplary ranges for the disclosed bimorf array. In general terms, the present invention is characterized in part by the ratio of (i) a difference between the inner radius and the outer radius of the emitting perimeter, to (ii) the outer radius of the emitting perimeter being within a numerical range of 0.1 to 1.0, or within a more preferred numerical range of 0.2 to 0.4.

In view of the foregoing relationships, it is apparent that the direction of propagation is a function of both the ring diameter and the space configuration of the internal region. A planar relationship for the emitter materials offers the most efficient system for several reasons. First, this planar configuration requires the least number of emitters to circumscribe the maximum area. Secondly, the planar relationship maximizes the in-phase relationship between each emitter. This is significant, in order to reduce SPL loss from phase cancellation.

FIG. 5 also illustrates an additional feature of the present invention wherein the bimorf emitters are spaced from each other to provide a surrounding separation distance from adjacent emitters. Such a concept of spaced positioning appears to offer further economy by reducing the amount of emitter surface within defined rings of specific diameters. In other words, by reducing emitter material with the specific ring configuration, a further reduction in cost is achieved, yet proportional reductions in SPL do not occur. These open segments 55 can be empirically adjusted to optimize the parametric output, while maintaining the desired radial or diametric relationships mentioned above. Generally, the gaps formed by this displacement will range from 0.5 to 2.0 cm, and more preferably, from 0.2 to 1.5 cm. This concept is developed further in a continuation in part application to be filed by the present inventor.

A description of the remaining speaker components will briefly identify operating elements generally necessary to drive a parametric speaker as shown in FIG. 6. An ultrasonic frequency signal source 60 is coupled to a modulating device 61 for providing a first ultrasonic frequency signal. Typically, this frequency is considered the carrier signal and will operate at a specific value within the ultrasonic range from 40 Khz to approximately 80 Khz. Actual frequency value, however, will be a function of desired operation parameters. For example, higher frequencies will be absorbed in air more rapidly than lower frequencies. Therefore, the desirable energy of higher frequencies is mitigated by loss of active interference or interaction along the ultrasonic beam. Lower frequencies will extend the length of the ultrasonic radiation, thereby extending the length of active interference or interaction which converts the ultrasonic energy to indirect audio output.

A sonic or subsonic frequency generator 62 is provided for supplying an electrical signal corresponding to the new sonic or subsonic frequency. This may be music, audio of general form, or even subsonic radiation. This sonic or subsonic source is mixed with the carrier signal in a modulating device such as a conventional AM modulator 61. A modified waveform having the first ultrasonic frequency as a carrier with single or double sidebands as the second ultrasonic frequencies is thereby provided to a power amplifier 63, and is directed to the emitter ring 64. Parametric output is developed in accordance with principles as described above.

It will be apparent to those of ordinary skill in the art that the foregoing example are merely exemplary of the inventive principles disclosed herein. Accordingly, these specific embodiments are not to be considered limiting, except as defined in the following claims.

We claim:

1. A parametric speaker sound emitting device for providing at least one new sonic frequency as a by-product of emitting at least two ultrasonic frequencies from an ultrasonic frequency emitter, comprising:
   an emitting perimeter of ultrasonic emitting material having an outer radius and an inner radius respectively surrounding an interior open space,
   wherein a ratio of (i) a difference between the inner radius and the outer radius of the emitting perimeter to (ii) the outer radius of the emitting perimeter is within a numerical range of 0.1 to 1.0.

2. A device as defined in claim 1, wherein the ratio is within the numerical range of 0.2 to 0.4

3. A device as defined in claim 1, wherein the emitting perimeter comprises a substantially continuous ring of emitter material.

4. A device as defined in claim 1, wherein the emitting perimeter comprises segments of emitter material.

5. A device as defined in claim 1, wherein the emitting perimeter comprises an array of piezoelectric emitters forming at least one ring of emitting material around the open space.

6. A device as defined in claim 1, wherein the emitting perimeter comprises at least one electrostatic membrane.

7. A device as defined in claim 1, wherein the emitting perimeter includes piezoelectric film material.

8. A device as defined in claim 1, wherein the emitting perimeter comprises separated emitter elements which are displaced from adjacent emitter elements along a length of the emitting perimeter, thereby spacing the emitter elements with gaps wherein no ultrasonic emissions are occurring.

9. A device as defined in claim 8, wherein the gaps are within a range of 0.2 to 2.0 cm.

10. A device as defined in claim 9, wherein the gaps are within the range of 0.5 to 1.5 cm.

11. A sound emitting device for providing at least one new sonic frequency as a by-product of emitting at least two ultrasonic frequencies from an ultrasonic frequency emitter, said device comprised of:
    a plurality of ultrasonic emitting perimeter segments coupled together at adjacent edges and positioned around a central open section, said emitting perimeter having a directional orientation along a transmission axis;
    an ultrasonic frequency signal source for generating a first ultrasonic signal;
    a sonic or subsonic frequency generator for supplying an electrical signal corresponding to the at least one new sonic or subsonic frequency;
    modulating means coupled to the ultrasonic frequency signal source and sonic or subsonic frequency generator for mixing the first ultrasonic frequency signal with the electrical signal corresponding to the at least one new sonic frequency to thereby generate a waveform including the first ultrasonic frequency signal and a second ultrasonic frequency signal;
    said emitting perimeter comprising ultrasonic frequency emitting material coupled to an output of the modulating means for (i) propagating a waveform embodying both the first and second ultrasonic frequency signals, and (ii) generating the at least one new sonic frequency as a by-product of interaction between the first and second ultrasonic frequency signals.

12. A device as defined in claim 11, wherein at least one of the segments can be decoupled from its adjacent segment and wherein the plurality of segments can be collapsed together to a smaller volume for storage.

13. A device as defined in claim 11, wherein the plurality of segments comprise rectangular shapes having one edge which includes a hinge member for coupling to a hinge member of an adjacent segment, said open section forming a rectangular opening.

14. A device as defined in claim 12, wherein the smaller volume of the plurality of segments forms a box shape providing a convenient storage configuration.

15. A method for enhancing efficiency of a parametric speaker sound emitting device for providing at least one new sonic frequency as a by-product of emitting at least two ultrasonic frequencies from an ultrasonic frequency emitter with respect to energy output based upon emitter surface area, said method comprising the steps of:
    a) forming an ultrasonic frequency emitting perimeter around an open region which is substantially void of ultrasonic emitting material; and
    b) emitting ultrasonic frequency from the emitting perimeter to generate sonic or subsonic sound within surrounding air as part of a parametric speaker system.

16. A method as defined in claim 15, further comprising the step of forming the emitter material with individual emitter elements positioned along the emitting perimeter and spacing the emitter elements at separated distances from adjacent emitter elements, thereby avoiding closed configuration of the emitter elements and reducing power losses resulting from shock effect of localized emitter energy at an air interface with the emitter elements.

* * * * *